United States Patent [19]
Hawkins et al.

[11] Patent Number: 5,042,345
[45] Date of Patent: Aug. 27, 1991

[54] SHEARING MACHINE

[75] Inventors: Paul F. Hawkins, Summerfield; Leon F. Wagoner, Browns Summit, both of N.C.

[73] Assignee: Wysong & Miles company, Greensboro, N.C.

[21] Appl. No.: 418,385

[22] Filed: Oct. 6, 1989

[51] Int. Cl.$^5$ .......................... B23D 15/14; B26D 5/16
[52] U.S. Cl. ......................................... 83/385; 83/624; 83/628; 83/639.1; 83/640; 74/55; 91/339; 248/674
[58] Field of Search ................. 83/375, 385, 386, 466, 83/624, 628, 639.1, 640, 641; 74/55; 248/674; 91/339, 340, 275, 361; 60/369; 92/122

[56] References Cited

U.S. PATENT DOCUMENTS

| | | | |
|---|---|---|---|
| 1,722,819 | 7/1929 | Munschauer | 83/386 |
| 2,780,287 | 2/1957 | Mueller | |
| 3,122,048 | 2/1964 | Warner | |
| 3,316,790 | 5/1967 | Frederiksen | 83/679 |
| 3,432,705 | 3/1969 | Lindtveit | 248/674 X |
| 3,691,890 | 9/1972 | Kuchyt | 83/624 |
| 3,945,287 | 3/1976 | Dvorak | 83/628 |
| 4,257,295 | 3/1981 | Patel | 83/374 |
| 4,463,642 | 8/1984 | Minato et al. | 83/640 X |
| 4,506,433 | 3/1985 | Gungras | 29/560 |
| 4,679,473 | 7/1987 | Hirata et al. | 83/624 X |
| 4,680,930 | 7/1987 | Dollison | 60/369 X |

OTHER PUBLICATIONS

Wysong brochure entitled *Hydra-Mechanical Press Brakes*.

Primary Examiner—Mark Rosenbaum
Assistant Examiner—Eugenia A. Jones
Attorney, Agent, or Firm—Rhodes, Coats & Bennett

[57] ABSTRACT

The vertically reciprocal upper blade assembly of a sheet metal squaring shear is activated in a substantially vertical path past a fixed lower blade by means of one or more reciprocal rotary hydraulic actuators. The output drive shaft of the hydraulic actuator(s) is connected to one or more drive straps by an eccentric cam which is keyed to the drive shaft and rotatably received within the straps. The horizontal gap between the upper blade and the lower blade is precisely controlled by suspending the blade supporting gib bracket from pins on the side walls of the apparatus housing and adjustably connecting the gib plate to the pins by eccentric cams. The gib mounting system also provides for adjusting the angle of the upper blade with respect to the lower blade. An improved hold down assembly limits the stroke of the hold down pins to maintain a slight clearance between the hold down pins and the bed surface at all times. A unique hydraulic actuator mounting bracket facilitates alignment of the actuator with the drive shaft by permitting adjustment of the actuator relative to the shaft after the shaft is properly mounted and aligned in the machine frame.

32 Claims, 6 Drawing Sheets

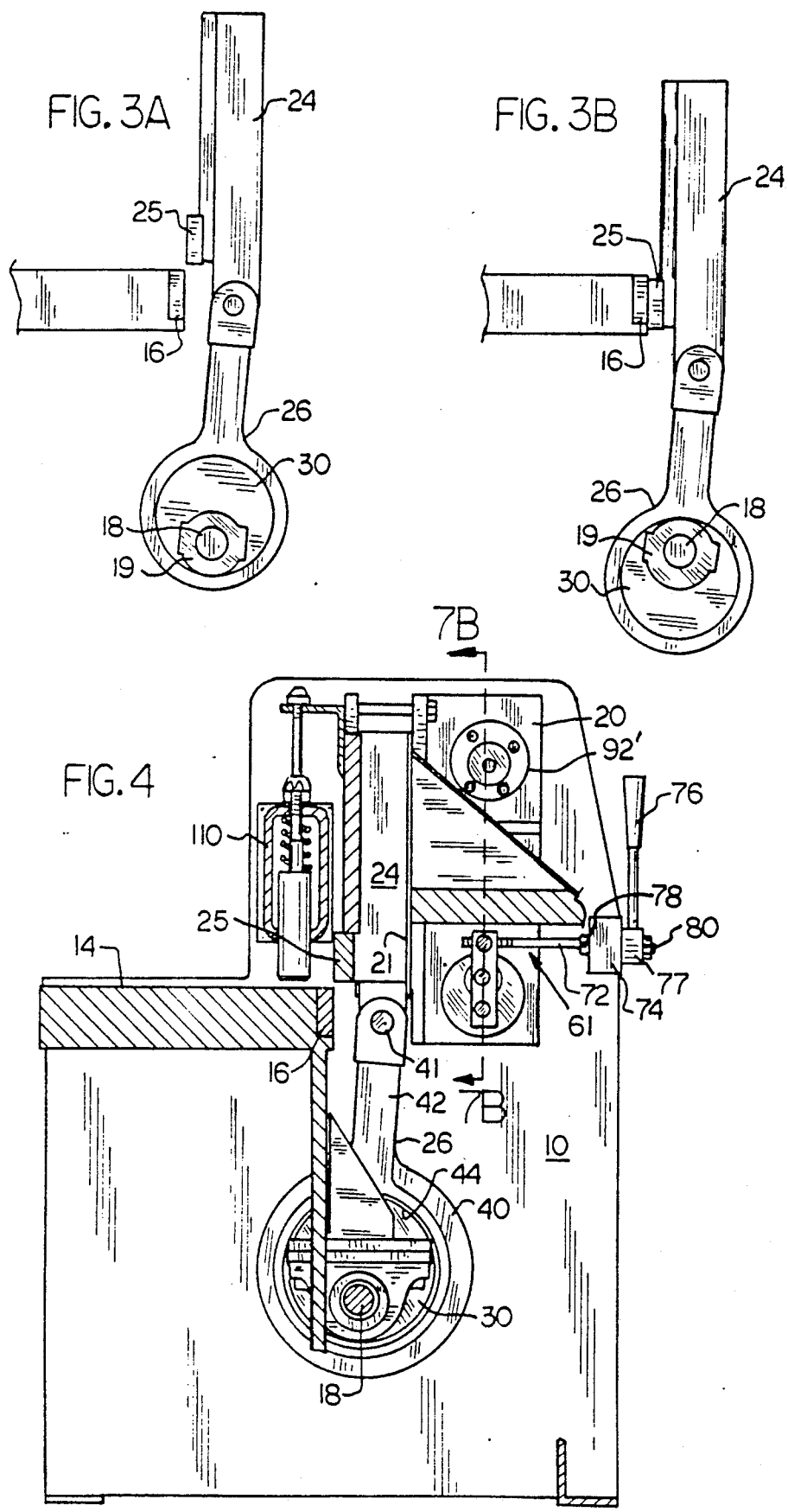

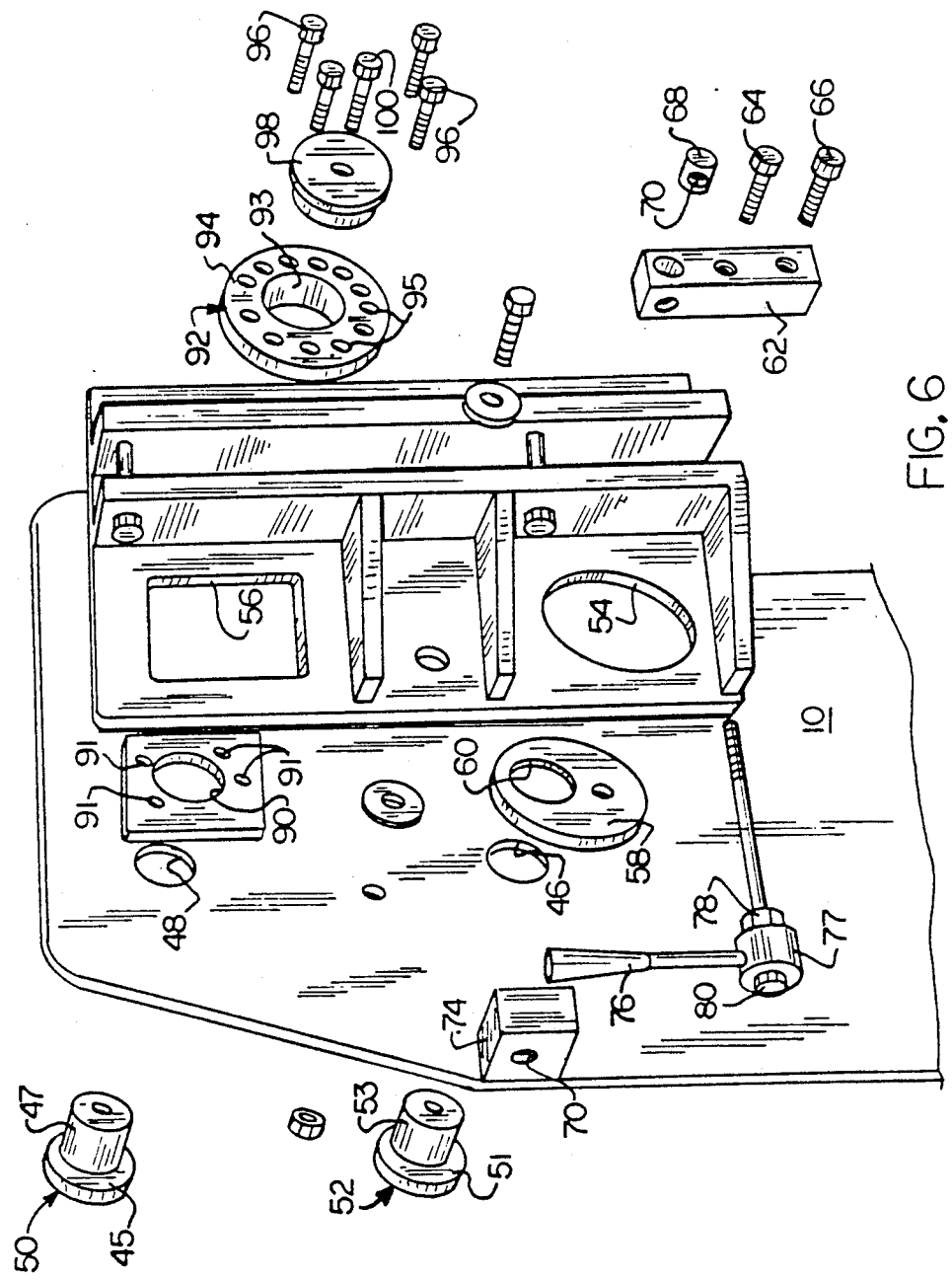
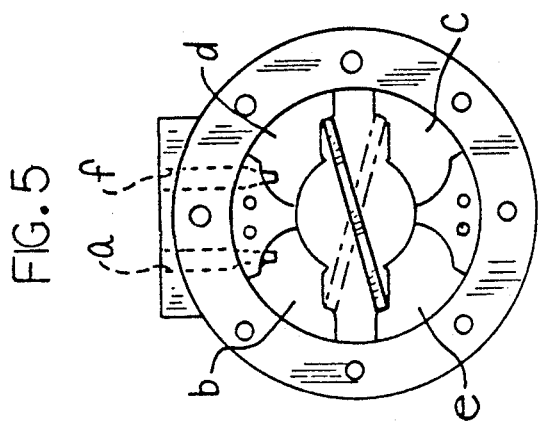

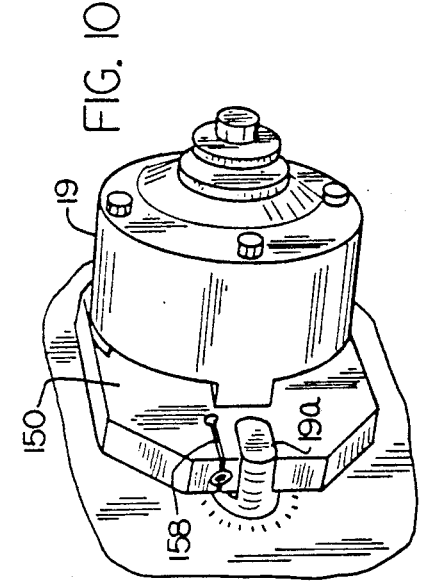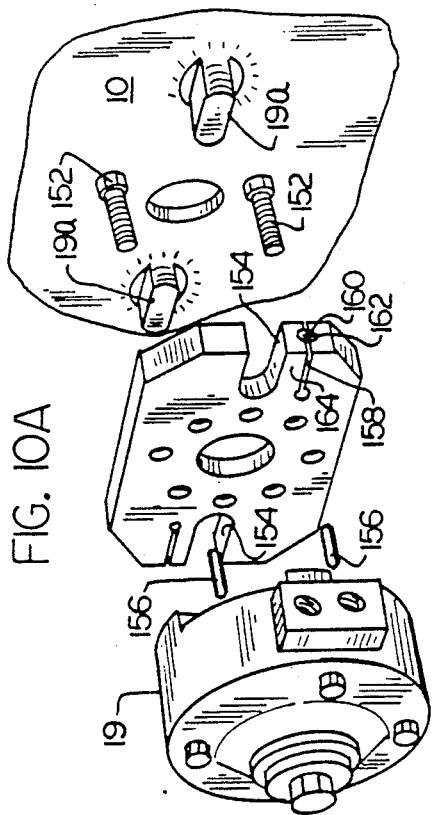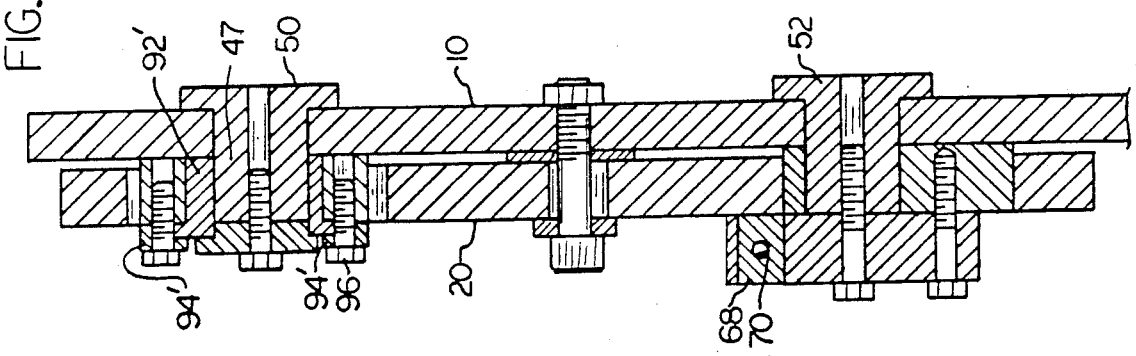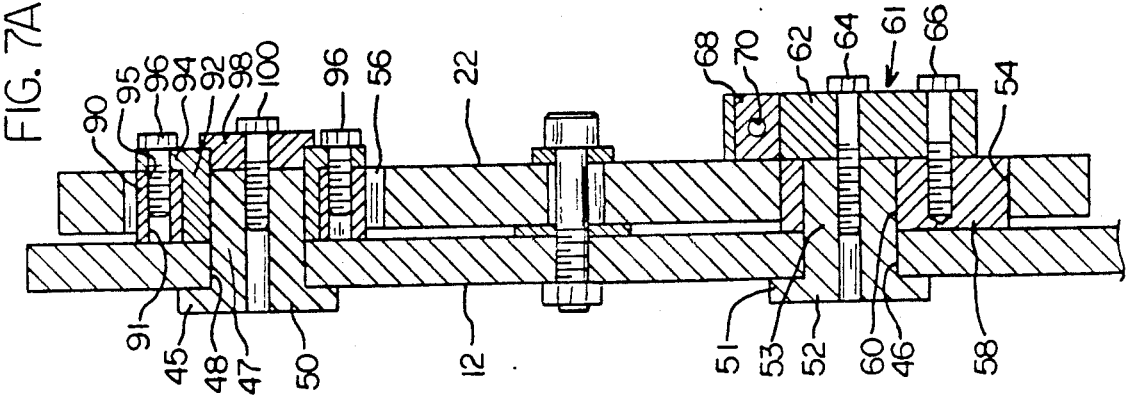

SHEARING MACHINE

BACKGROUND OF THE PRESENT INVENTION

This invention relates to sheet metal squaring shears, and, more specifically, to improvements in the apparatus which drives the movable blade, the blade gap adjustment mechanism, a workpiece hold down device, and the manner in which the drive actuator is mounted to the apparatus. While the ensuing description is directed to the squaring or shearing of metal, the machine of the present invention may also be utilized in conjunction with the shearing of paper, cardboard, or even plastic.

One aspect of conventional metal working operations necessitates the squaring or shearing of metal sheets or plates, which may vary in thickness from a few thousandths of an inch to a half inch. The apparatus for performing this operation is conventionally called a squaring shear. In most sheet metal squaring shears, a fixed lower blade is secured to a bed. The metal sheet or other workpiece to be sheared is laid onto or fed over the bed, and a movable upper blade is mounted for reciprocation back and forth past the fixed lower blade. As the upper blade moves downwardly past the lower blade, it engages the metal sheet or workpiece to be sheared, and cuts the workpiece between the fixed blade and the vertically movable blade.

In several types of shears, the upper moving blade is mounted on a piece of apparatus called the ram, and the ram is slidably mounted between two tracks in opposed side brackets which are conventionally called gibs. Each gib is a support plate or bracket which is mounted to the side wall of the machine frame. Therefore, the movable blade extends between the side walls of the housing and reciprocates vertically along the tracks in which it is held.

Squaring shears are divided into two general types. Mechanical shears are of the type in which a continuously rotating electric motor turns a flywheel which operates through a gear box to turn a drive shaft. The advantages of such machines include a faster and thus cleaner cut, relatively high production (up to 60 cuts per minute), and minimum blade clearance adjustment. It has been found that the quicker the blade moves through the material, the cleaner the cut and the less the tendency of the material to bend or distort from side to side. On the Other hand, mechanical shears are relatively expensive in that they require more parts and many of the parts are expensive custom mechanical parts. Further, the mechanical shear must travel through the entire 360° of the motor for each stroke and "short stroking" is not possible. Also adjustment of the blade clearance or "gap" is difficult.

The second type of shearing machines are the hydraulic shears. Such machines utilize one or more reciprocal linear hydraulic actuators to activate the upper blade relative to a fixed lower blade. Hydraulic shears are relatively simple as compared to mechanical shears and generally require fewer and less complicated parts than their mechanical counterpart. Thus the initial cost of hydraulic shears is less (approximately 75% as much as mechanical shears). Other advantages include the capability of "short stroking", rapid blade adjustment, and include inherent overload protection. However, there are distinct limitations to these machines. For example, the speed of the cut is much slower (approximately 15-18 strokes per minute). This results in a cut that is less clean, greater material distortion, and significantly less production. Adjustment of the blade clearance must occur more often.

SUMMARY OF THE PRESENT INVENTION

In the present invention, the above concerns are addressed where, broadly, a shear is provided in which the speed of cut and higher production advantages of the mechanical shear are combined with the lower initial cost and other features of the hydraulic shear. The resulting machine is so simplified that it can be marketed at prices below that of even hydraulic shears. Generally, the structure of the present invention adopts a drive system which features a reciprocal, rotary hydraulic actuator (sometimes referred to as a hydraulic motor). Other features include an improved blade gap adjustment system, an improved hold down system, and a unique hydraulic rotary actuator mount system. In general, the present invention is directed to a sheet metal shearing machine which is driven by the aforesaid reciprocal, rotary hydraulic actuator keyed to a drive shaft which is, in turn, connected to opposed drive straps by eccentric cams mounted on the drive shaft. The drive straps are pivotally connected to the ram which carries the upper blade. The reciprocal rotary hydraulic actuator is so operated as to subtend an arc of approximately 180°.

Preferably, a reciprocal, rotary hydraulic actuator is mounted at each end of the drive shaft to insure an evenly applied force on the ram. The drive shaft extends parallel to and beneath the ram with the drive straps extending upwardly therefrom to be pivotally mounted to the lower edge of the ram. The drive shaft is journalled in bearings in or on the side walls of the frame, and the hydraulic actuators are adjustably mounted onto either end of the drive shaft.

In the present invention, in order to adjust the blade gap, there is generally provided a means for quickly, easily, and effectively moving the upper blade horizontally with respect to the bearing plate and lower fixed blade. In order to effect such adjustment, the gib brackets which support the ram are suspended from a pair of vertically spaced pins extending inwardly from the opposed side walls of the machine frame. An eccentric cam connects each gib bracket to the pins. An activating mechanism rotates the eccentric cam with relation to the gib plate to effect slight horizontal adjustments thereof. In order to allow for the slight vertical movement of the gib plate which occurs as the gib plate is tilted, the gib plate is connected to the upper pin by a slide block which permits the aforementioned displacement. An upper mounting eccentric is also utilized to selectively adjust the angle of the ram (and upper blade) with respect to the lower blade.

As workpieces are processed through the shear of the present invention, the hold down pins are provided with stops which limit the stroke thereof and prevent engagement of the pins with the machine bed. The stops allow for the pins to be preset, so that the hold down bracket may more easily be mounted onto the machine and adjusted thereon.

A primary advantage of the present invention is to provide a shearing machine that is extremely simple and much less costly than shearing apparatuses presently in use. Yet the machine realizes both the production and blade speed advantages of mechanical shears with the flexibility features of hydraulic shears. The shearing machine of the present invention realizes the additional following advantages over conventional shearing apparatuses:
1) The cutting speed of the ram is considerably faster as compared to shears which are operated by a reciprocal linear hydraulic cylinder.
2) The quality of the cut and the edge condition of the cut line is improved as compares to other hydraulic shears.
3) Closer blade clearances may be maintained.
4) Less material distortion occurs.
5) Less force is required to cut the same thickness and type of material than is required with other types of hydraulic shears.
6) The blade gap adjustment may be effected quickly and easily.
7) The spring clamp hold down of the present invention requires less maintenance as compared with hydraulic hold downs.
8) The machine of the present invention includes a lower profile than previously known machines.

It is, therefore, an object of the present invention to provide a new and improved power shearing apparatus.

It is also an object of the present invention to provide a shearing apparatus that combines the production and quality advantages of the mechanical shear with the economies of known hydraulic shears.

Another object of the present invention is to provide a shear of the type described having an improved drive system.

Another object of the present invention is to provide a squaring shear of the type described which includes an improved blade gap adjustment mechanism.

Still another object of the present invention is to provide a power shear of the type described which includes an improved hold down mechanism.

Other objects and a fuller understanding of the invention will become apparent upon reading the following detailed description of a preferred embodiment along with the accompanying drawings in which:

FIGS. 3A and 3B are schematic representations of the drive system according to the present invention illustrating the ram in the upper and lower positions respectively.

FIG. 4 is a sectional view taken along lines 4—4 in FIG. 1 illustrating the left hand side wall and the drive system of the present invention.

FIG. 5 is a schematic diagram of one form of the reciprocal rotary hydraulic actuator utilized as the means for driving the upper blade assembly.

FIG. 6 is an exploded perspective view illustrating the upper blade adjustment mechanism.

FIG. 7A is a sectional view taken substantially along lines 7A—7A of FIG. 1B.

FIG. 7B is a sectional view taken substantially along lines 7B—7B in FIG. 4.

FIG. 10 is a perspective view illustrating the apparatus for mounting the hydraulic actuator in accordance with the present invention.

FIG. 10A is an exploded perspective view of the motor mounting apparatus illustrated in FIG. 10.

DETAILED DESCRIPTION OF A PREFERRED EMBODIMENT

Figure 1A:
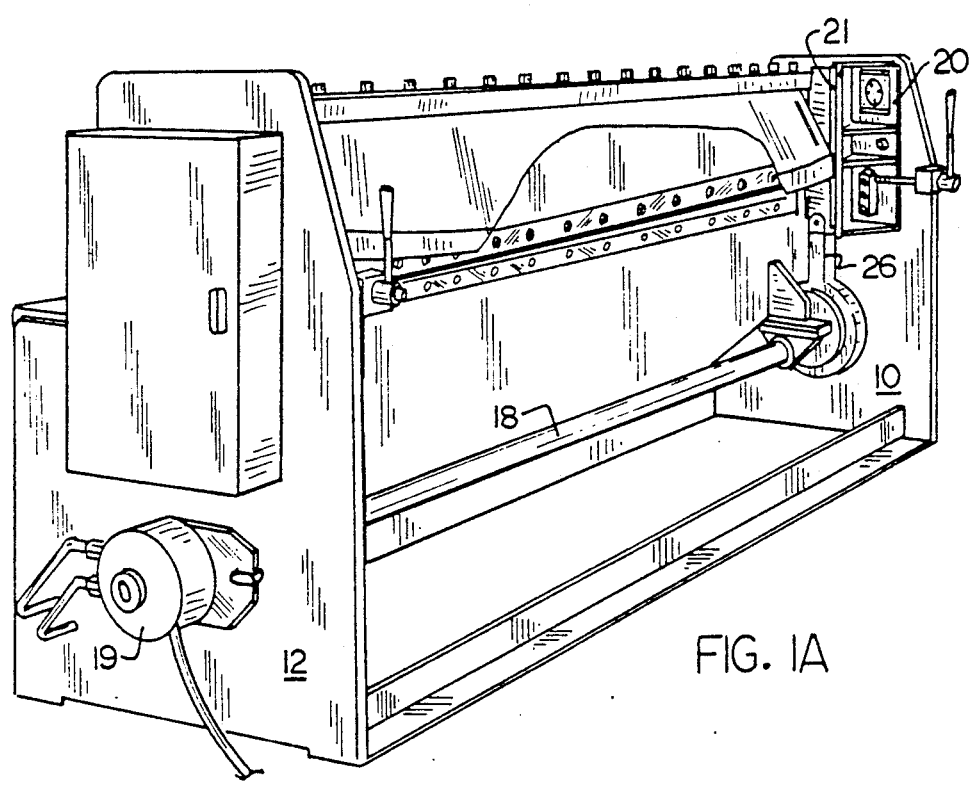
FIG. 1A is a perspective view of the sheet metal shearing machine illustrated in FIG. 1 and looking from the rear thereof.
Figure 1:
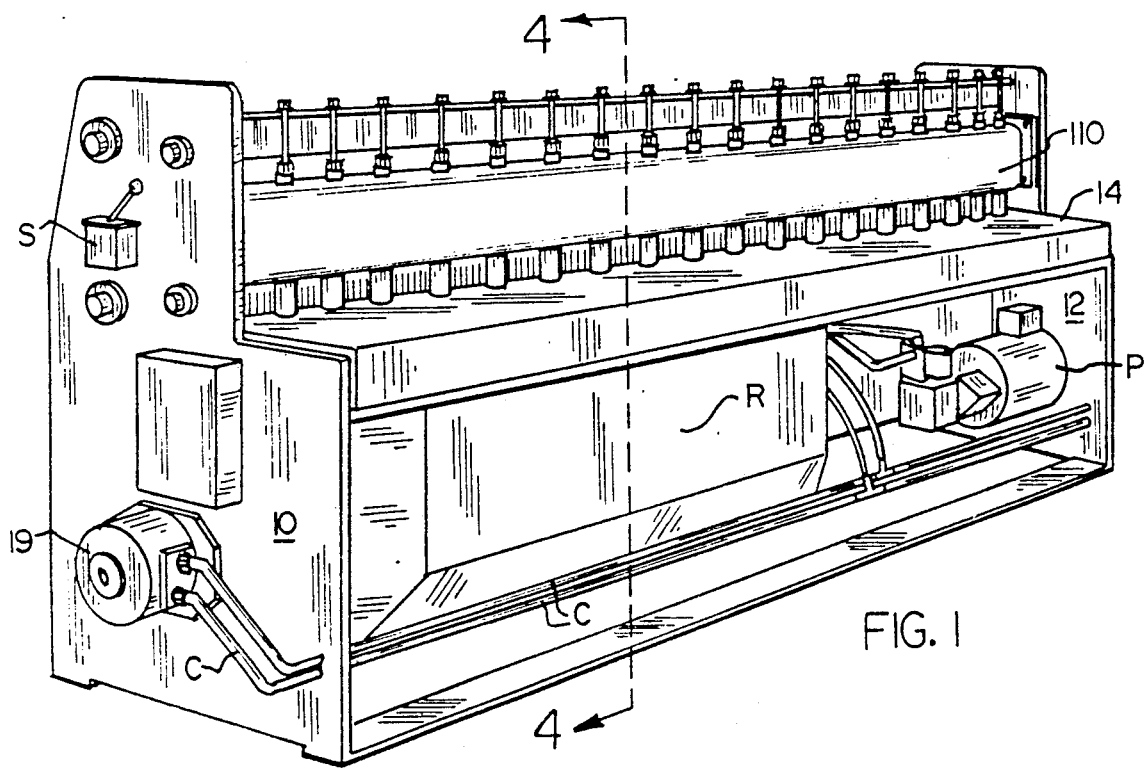
FIG. 1 is a perspective view of a sheet metal shearing machine of the present invention looking from the front thereof.

Turning now to the drawings, and more particularly to FIGS. 1, 1A, 1B, and 4, it is seen that the shearing apparatus of the present invention includes a framework which is generally in the shape of a bench. A pair of spaced, opposed side walls 10,12 are connected by a horizontally extending bed or platform 14. The fixed lower blade 16 is attached to the rear end of bed 14 and extends generally coextensive therewith. A hydraulic reservoir R and hydraulic pump P are mounted below the bed 14 on the front said of the machine and connected by appropriate conduits C, valving, and controls S.

A drive shaft 18 (FIG. 1A) is mounted for rotation between side walls 10,12. For this purpose, drive shaft 18 is journalled within bearings, which are in turn affixed to side members 10,12. A reciprocal rotary hydraulic motor or actuator 19 is attached to each end of drive shaft 18. Each hydraulic motor 19 is mounted on a mounting plate which is so connected to frame members 10,12 as to prevent rotation thereof. Thus, as mounted, the hydraulic actuators 19 are fixed, yet cause the drive shaft 18 to reciprocally rotate.

A pair of gib plates or brackets 20,22 are mounted, one to the inner surface of each side wall 10,12. Each gib plate includes a slide track 21,23, respectively, which supports a ram 24 for vertical reciprocating movement. The upper blade 25 is fixed on the lower front edge of the ram 24. As the ram is lowered with each stroke, the upper blade 25 is caused to move past lower blade 16 and thereby make a shearing or squaring cut. Drive straps 26,28 are mounted on drive shaft 18 at either end thereof, and are pivotally connected to the lower edge of ram 24. Each drive strap 26,28 includes an enlarged end with an opening therein. An eccentric cam 30 is mounted for rotation within the aforesaid opening and is keyed to drive shaft 18, so that reciprocal rotary motion of drive shaft 18 is thereby translated into vertical reciprocal motion of ram 24.

In general, there are four aspects to the present invention. Such aspects include the drive system which activates ram 24; the manner in which the gap between upper blade 25 and lower fixed blade 16 is set; the hold down apparatus; and the hydraulic motor mounting system. Each of these aspects will be discussed in detail in the following sections.

Drive System

Figure 2:
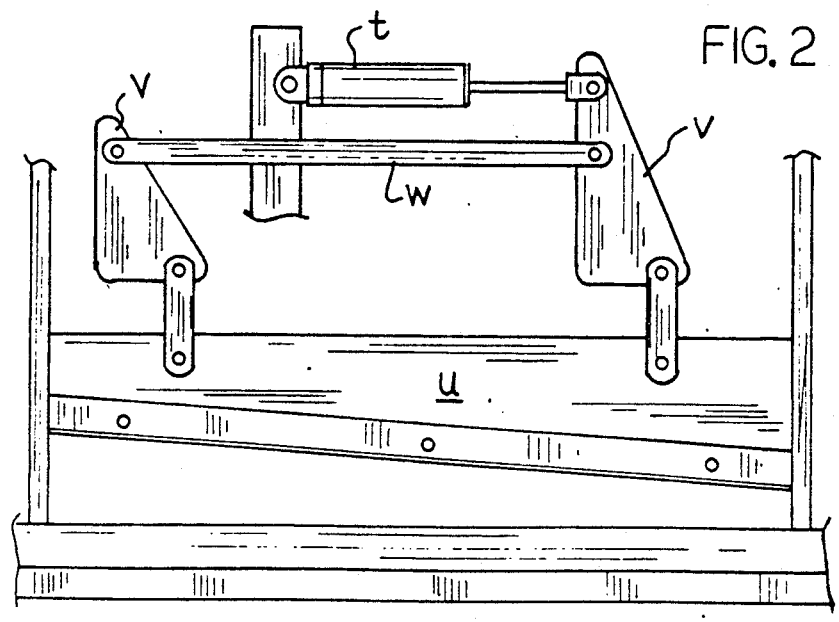
FIG. 2 is a schematic representation of a typical prior art linear hydraulic drive mechanism.

Turning now to FIGS. 2, 3A and 3B, there is illustrated schematically the drive system of the present invention (FIGS. 3A and 3B) as distinguished from the drive system of the prior art devices (FIG. 2). In previously known drive systems, either a linear hydraulic actuator t was connected to the drive ram u by a plurality of levers v (FIG. 2) operating through a linkage w, or a rotating electric motor was connected to a flywheel (not shown) to impart reciprocating motion to the ram member. Generally, the hydraulic linear actuator and its connecting linkages, or the electric motor and its flywheel were arranged above the upper ram.

In FIGS. 3A and 3B, there is illustrated schematically the drive system of the present invention as distinguished from the above described drive systems. In its most general aspects, referring to FIGS. 3A and 3B, the drive shaft 18 of the present invention is driven in a reciprocating arcuate path by the aforementioned reciprocal rotary hydraulic motor or actuator 19. An example of a suitable hydraulic rotary actuator is the Micro Precision Hyd-Ro-Ac, Model #HS6. Micro Precision Operations is a manufacturer of hydraulic actuators and is located in Berne, Ind. The reciprocal rotary hydraulic actuator 19 converts hydraulic pressure into reciprocating output shaft movement through a 180° arc. The rotary hydraulic actuator is an extremely compact device that produces torque from hydraulic pressure. Its rotary output permits a simple and versatile system design which eliminates expensive and cumbersome linkages, as well as minimizing lost motion. Reciprocating rotary actuators offer distinct torque advantages for start/stop operation and the acceleration of large masses, which result in an ideal power source for all types of mechanical motion.

A schematic representation of such a reciprocating, rotary motor is best illustrated in FIG. 5. In operation, when high pressure fluid enters port a, which in turn is connected to chamber b, the high pressure fluid causes chambers b and c (which is connected to chamber b by internal porting) to increase in volume. The other pair of chambers d,e connected to the discharge port f will reduce in volume. The fluid flow caused by high fluid pressure acting on one side of the wingshaft vanes, with a low pressure on the other side, rotates the wingshaft in a counter-clockwise direction. When the fluid is reversed, i.e., when high pressure fluid is applied at port f and port a becomes connected to discharge pressure, rotation in the opposite direction takes place. The torque developed by the actuator is proportional to the area of the wingshaft vane and the hydraulic fluid pressure differential. Speed of rotation is dependent on the flow and pressure capacities of the hydraulic system.

The rotary hydraulic motors 19 are adjustably connected to end walls 10,12 to fix them against rotary movement relative to drive shaft 18. In the instant application, the rotary motors are set for reciprocal rotary movement in a 180° arc. While an arc of 180° is preferred, slight variations therefrom should still prove operative. The reason for the 180° arc will become apparent upon reading the following explanation.

The drive strap 26, as previously described, is connected at its lower end through an eccentric cam 30 to drive shaft 18. At the upper end, drive strap 26 is pivotally connected by a pivot pin 41 to the lower portion of vertically reciprocal ram 24. Drive strap 26 includes an enlarged lower end 40 and an upwardly extending arm 42. A large bearing opening 44 is provided in the enlarged end 40 of drive strap 26. The eccentric cam 30 is mounted in rotatable bearing relationship with the opening 44, and is keyed to drive shaft 18 to be actuated in a reciprocating arcuate path responsive thereto. The eccentric cam 30 is so arranged that, at one end of its stroke, the center of center of drive shaft 18, which corresponds to the uppermost position of ram 24. In the lowermost position of ram 24, the center of eccentric 30 is substantially aligned with and below the center of drive shaft 18. The distance between the center of eccentric 30 and the center of drive shaft 18 is referred to as the "throw", which is one-half of the total stroke of the ram 24. In the preferred embodiment, the stroke of ram 24 is approximately $3\frac{3}{4}$ inches. Therefore, the throw is approximately $1\frac{7}{8}$ inches. The reciprocal rotary hydraulic motor operated through a 180° arc, and so connected to the ram by an eccentric that each 180° arc of the motor results in a complete stroke of the ram leads to the attendant beneficial results of the present invention.

Figure 1B:
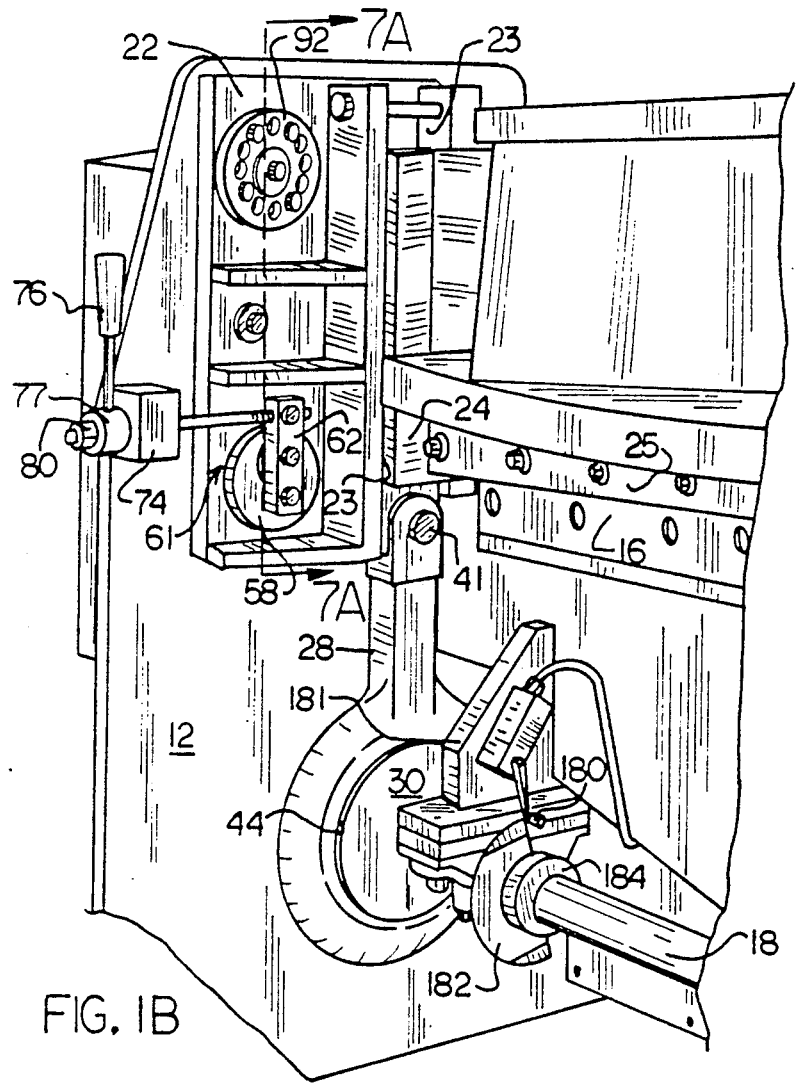
FIG. 1B is a perspective view, with parts broken away, of the rear inner surface of one of the side walls illustrating one end of the drive system and the upper blade gap adjustment mechanism.

Referring now to FIG. 1B, there is illustrated a control means for limiting arcuate movement of actuator 19 to 180°. A limit switch 180 is mounted on the bearing housing 181 in the path of a semicircular disc 182. Disc 182 is mounted on drive shaft 18 by a hub 184. As the hydraulic fluid is introduced to the inlet port a, the actuator 19 begins rotation in one direction. As long as the disc 182 remains in contact with limit switch 180, the rotation continues. As soon as the disc 182 disengages limit switch 180, the actuator 19 is deactivated. Conventional valving then reverses the flow of hydraulic fluid so that fluid is introduced into port f. The drive shaft 18 then rotates in the opposite direction again, for so long as disc 182 remains in contact with limit switch 180. When the disc disengages limit switch 180, the actuator 19 is again deactivated and is ready for another cycle.

Normally, a shear machine having such a drive system is considerably more economical to build because of a considerable reduction in parts and machining. Further, the resulting machine is more compact in size. Because of the unique arrangement between the hydraulic motor and the eccentric arrangement, the upper blade of the present invention develops its highest force ratio early in the stroke as the workpiece to be sheared is first entered. Further, the machine operates more nation of a flywheel or a continuously rotating drive cam reduces the angle of deviation of the drive strap to one-half the normal. This is true because the drive mechanism does not undergo a complete revolution, but only a half revolution, therefore the angle of deviation is minimized.

Upper Blade Gap Adjustment

Turning now to FIGS. 1B, 6, 7A and 7B, there is illustrated the unique upper blade gap adjustment apparatus of the present invention. Each side wall 10,12 is provided with a pair of vertically spaced openings 46,48 therein. An upper mounting pin 50 is inserted through the opening 48 and a lower mounting pin 52 is inserted through opening 46. Each mounting pin includes an enlarged head portion 51,45 and a cylindrical shank 53,47 extending through the appropriate opening 46 or 48 and protruding from the opposite or inner surface of the side wall 10 or 12. It is upon these two pins 50,52 that the gib bracket 20 is adjustably mounted. The primary adjustment mechanism is associated with the lower pin 52 as follows.

The gib bracket 20 includes a lower, generally circular opening 54 therein. An eccentric cam 58 includes a circular periphery generally of the same size as the opening 54 or slightly smaller so that it is rotatably received therein. The eccentric cam 58 includes an opening 60 therein of approximately the same size and shape as the shank 53 of pin 52. The opening 60, however, is off-center of the center of cam 58. It is this eccentric cam 58 that provides the lateral adjustment of gib bracket 20.

An adjustment means 61 is attached to eccentric cam 58 on the inner surface thereof. The adjustment means 61 includes a block 62 which is secured to the inner surface of cam 58 by means of threaded fasteners 64,66.

A swivel pin 68 is mounted in a transverse opening in the upper portion of block 62 for rotation therein. The axis of rotation of swivel pin 68 is parallel to the axis of rotation of eccentric cam 58. The swivel pin 68 includes a threaded opening therein which extends along a path parallel to the intended path of adjustment of gib bracket 20. A threaded rod 72 extends through the threaded opening 70 and extends rearwardly therefrom through a mounting bracket 74 rearwardly of the machine. Mounting block 74 is secured to the inner surface of side wall 10. Rod 72 is so mounted in bracket 74 that it can rotate but is restrained from linear movement forwardly or rearwardly. An adjustment handle 76 is suitably fixed to the adjustment rod 72 by a collar 77. A pair of locking nuts 78,80 prevent movement of collar 77 along rod 72.

So arranged, as the handle 76 is rotated in one direction or the other about the axis of threaded rod 72, rod 72 is turned with respect to the adjustment block 62. Since rod 72 is threaded, rotation thereof will cause movement of the adjustment block 62 forwardly or rearwardly, which will cause a resulting pivotal movement of eccentric cam 58 about the axis of opening 60. Such pivotal movement of eccentric cam 58 then causes a resulting forward or rearward movement of gib plate 20, thus providing for fine blade gap adjustments of the upper blade 25.

When the eccentric cam 58 is rotated in one direction or the other, the resulting overall movement of gib plate 20 is a slight angular or pivotal movement of the lower portion in one direction or the other. Since the movement is angular, there will also result a vertical component, which tends to shift the gib plate slightly upwardly. Therefore, there must be some allowance made at the point where the gib plate 20 is mounted on upper pin 50 to allow for the vertical component of movement. Otherwise, the gib plate will bind and not be shiftable. The following discussion describes the cooperating movement of the gib plate relative to the upper mounting pin 50.

Again, the upper pin 50 includes an enlarged head 45 with a cylindrical shank 47 that extends through the opening 48 in side wall 10. The portion of the cylindrical shank 47 that extends through the opening 48 supports an adjustment means, which generally includes a slide block 90 and an eccentric adjusting cam 92. The slide block 90 is of similar size and shape as the rectangular opening or window 56 in gib bracket 20, except that the slide block 90 is smaller in its vertical dimension than the opening 56. An eccentric cam 92 includes an opening 93 therein which is used to mount the cam 92 onto the extension of shaft 47. The center of opening 93 is off-center from the center of cam 92, so that an eccentric cam surface around the periphery is formed. A fastening nut 98 is used to secure the eccentric and slide block to prevent inward displacement thereof.

The eccentric cam 92 includes a peripheral flange 94 extending around the periphery thereof. A plurality of arcuately spaced openings 95 extend through the flange 94 for the purpose of attaching the eccentric cam 92 to slide block 90. There are only four openings 91 in slide block 90, and the eccentric 92 may be rotated about pin 50 by using different combinations of openings 91,95. As the cam 92 is rotated, it can be seen that the peripheral surface of the cam will cause a forward or rearward shifting of the gib plate, since the pin 50 is fixed, thereby fixing the axis of opening 93 in eccentric 92. Thus, rotation of the cam will cause the periphery of the eccentric cam 92 to urge the gib plate 20 and slide block 90 forwardly or rearwardly. This will result in a change or adjustment of the angle of the ram and upper blade with respect to the fixed lower blade. At times, it is highly desirous to adjust this angle of inclination, depending upon the type and thickness of material being processed.

So arranged, the slide block 90 allows gib plate 20 to move vertically within opening or window 56 as the blade gap adjustment is made by rotation of the operating lever 76. Also, rotation of the eccentric 92 will cause a change in the inclination of the upper blade with respect to the fixed lower blade as is necessary.

While the blade gap adjustment mechanism has been described primarily with respect to the right-hand side wall 12, the left-hand side wall 10 includes substantially the identical apparatus, so that adjustments on both sides may be made, which prevents canting or skewing of the ram. Alternatively as illustrated in FIG. 7B, the eccentric cam 92' on one of the gib brackets may have a portion of the flange 94 removed and clamped by means of a ring clamp 94'. This allows the mounting arrangement on one side to be loosened by releasing clamp 94'. When the cam flange 94 on the opposite side is set, the eccentric cam 92' beneath clamp 94' may be adjusted to align the angle on upper blade 25 with the opposite side. Then the clamp 94' is tightened and the blade angle is set.

Hold Down Device

Figure 8:
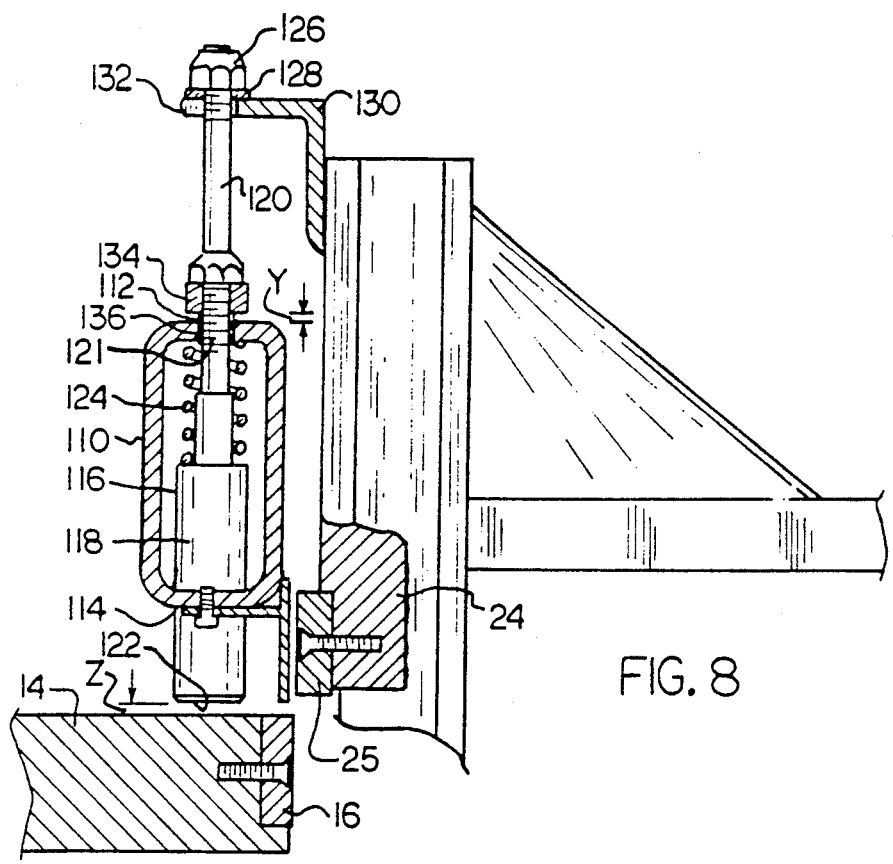
FIG. 8 is a sectional side view of the hold down mechanism of the present invention with the upper blade in its uppermost position.
Figure 9:
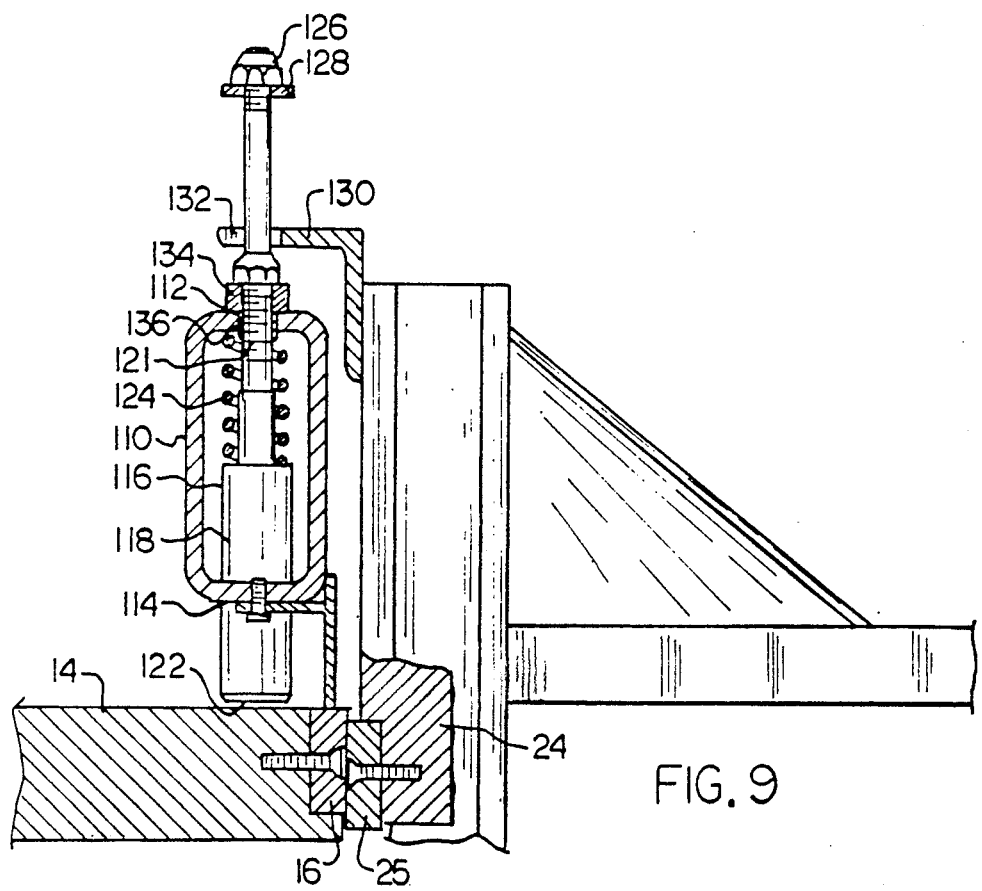
FIG. 9 is a sectional view similar to FIG. 8, except illustrating the hold down mechanism with the upper blade in its lowermost position.

In FIGS. 4, 8 and 9, there is illustrated a unique type of hold down apparatus which is operable to secure the workpiece in place on bed 14 during the downward stroke of the upper blade 25. A hollow, tubular, generally rectangular housing 110 is fixed between side walls 10,12 at a position immediately upstream of the ram 24. A plurality of openings 112 in the upper wall of channel support 110 and a plurality of openings 114 extending along the lower wall of channel member 110 provide access for a plurality of hold down pins 116 therein for reciprocal movement between an uppermost and lowermost position. The hold down pins 116 include an enlarged lower cylindrical portion 118 with a smaller rod 120 extending upwardly therefrom through openings 112. At least a portion of the upwardly extending rod 120 is threaded at 121 for reasons to be hereinafter described. The lower extremity 122 of the cylindrical portion 118 is moved into and out of engagement with a workpiece after it is properly positioned and immediately prior to the engagement of the workpiece by the upper blade 25. A compression spring 124 is seated around the rod portion 120 between the underneath surface of the upper wall of housing 110 and the upper end of the enlarged portion 118 of each pin 116. So positioned, spring 124 normally biases each hold down pin 116 in a downward direction. Unless otherwise retained, the spring 124 will urge pin 116 into engagement with bed 14 at all times. However, during the upward stroke of ram 24, an L-shaped lift bracket 130 having slots 132 therein engage the underneath surface of a nut 126 and washer 128 which are secured at the upper end of rod 120. The lift pressure exerted by the upward stroke of ram 24 then lifts the hold down pins simultaneously to their uppermost position, out of engagement with bed 14 and clear of any incoming workpiece.

In the present invention, however, a stop 134 in the form of a nut with a sleeve 136 of less diameter is threadably secured to the threaded portion 121 of rod 120. The sleeve 121 also extends through opening 112 and does not interfere with the sliding movement of rod 120. The stop 134 is set so that its undersurface is a prescribed distance y from the upper surface of the upper wall of housing 110. The distance y denotes the distance between the stop nut 134 and the upper surface of the upper wall of housing 110. The distance z is the initial setting between the lower end 122 of pin 116 and the upper surface of bed plate 14. The stop nut 134 is set so that the distance y is always less than the distance z.

So arranged, as the ram 24 is activated in its downward stroke, the support bracket 130 lowers, allowing the compression spring 124 to urge the hold down pin 116 downwardly. This downward movement continues until the stop nut 134 engages the upper surface of support channel 110. The hold down pin is thus maintained clear of the bed plate 14 at all times (preferably approximately 0.010 inches), although the ram 24 continues its downward movement to its lowermost point as illustrated in FIG. 9.

Mount for Rotary Actuator

As previously described, the reciprocal rotary hydraulic motor 19 is not secured in fixed relationship to the wall 10 of the machine frame. Rather, motor 19 is adjustably mounted thereto by means of an adjustable mounting bracket 150. This adjustable mounting system facilitates initial alignment and subsequent readjustment, as may be necessary, of the motor 19 with respect to the drive shaft 18.

First of all, the motor 19 is secured to the mounting plate 150 by means of a plurality of screws 152. The prevention of relative rotary movement between the motor 19 and plate 150 is also ensured by means of a pair of dowel pins 156 which extend through aligned openings in mounting plate 150 and the housing of motor 19. The mounting plate includes a pair of slots 154 on opposed sides thereof. The side wall 10 is provided with a pair of horizontally spaced lugs 19a extending outwardly thereof. Each lug 19a has a flattened upper and lower surface, and the thickness of the lugs 19a is slightly smaller than the width of slots 154. This provides for some slight adjustment of the mounting plate 150 with respect to the side wall 10 which will be discussed hereinbelow.

In order to adjustably secure the mounting plate 150 to studs 19a, there is provided a slit 158 through the mounting plate adjacent to and generally parallel with the slots 154. The slit includes an enlarged, tapered opening 160 thereinto. The side wall of opening 160 is threaded to receive a tapered plug 162. As the tapered plug is moved into and out of opening 160, the relatively thin wall portion 164 between slit 158 and slot 154 is caused to squeeze into engagement with the surface of lug 19a. This provides for adjustment of the mounting plate with respect to lug 19a, and thus side wall 10, to initially align the motor 19, as well as to provide for realignment or readjustment of the actuator, motor, should the alignment be disturbed. Where a second actuator is provided on the opposite side of end wall 12, the same mounting arrangement as described hereinabove is provided.

Although a preferred embodiment of the present invention has been described in detail hereinabove, it is apparent that various changes and modifications might be made without departing from the scope of the invention which is set forth in the accompanying claims.

What is claimed is:

1. A drive system adapted for use with sheet material shearing machines having a fixed lower blade mounted between opposed side members of a frame housing and an upper blade assembly which is mounted in vertically reciprocal relationship between said side members of said frame housing for movement past said lower blade on each stroke to shear one or more sheets of material inserted between said upper blade assembly and lower blade, said drive system comprising:
   a) a reciprocating rotary hydraulic actuator mounted to said housing;
   b) a drive shaft extending between said side members in parallel relation to said upper blade assembly and operatively connected to said rotary actuator for reciprocal rotary motion responsive thereto;
   c) a pair of drive straps, each having an opening in the lower end thereof, each of said drive straps receiving said drive shaft through said opening and being operatively connected thereto by an eccentric cam, said eccentric cam being keyed to said shaft and rotatively received within said opening, the axis of said shaft through said eccentric cam being spaced from the center of said cam, whereby reciprocal rotary motion of said drive shaft imparts vertical reciprocal movement of said drive straps;
   d) the upper end of said drive straps being pivotally connected to opposite sides of said upper blade assembly.

2. The drive system according to claim 1 wherein there are provided a pair of hydraulic actuators, each hydraulic actuator being operatively connected to opposite ends of said drive shaft for providing an even upward and downward movement of said upper blade assembly.

3. The drive system according to claim 1 wherein said reciprocating hydraulic rotary actuator includes a stop means for limiting the reciprocal rotary motion of said reciprocating hydraulic rotary actuator to an arc of approximately 180°, and wherein each of said eccentric cams is so connected to the corresponding drive strap that one end of the 180° arc corresponds to the uppermost position of said upper blade assembly and the other end of said 180° arc corresponds to the lowermost end of said upper blade assembly, whereby successive pairs of 180° arcs subtended by said reciprocating hydraulic rotary actuator results in either the upward or downward stroke of said upper blade assembly.

4. The drive system according to claim 3 wherein the distance between the axis of said drive shaft and the center of said eccentric cam equals one-half of the stroke of said upper blade assembly.

5. The drive system according to claim 3 wherein said drive shaft is journalled in bearing relationship to and extends between said side members of said frame housing beneath and in parallel relation to said upper blade assembly, and wherein each of said drive straps is pivotally attached to the lower portion of said upper blade assembly, whereby reciprocal rotary motion of said drive shaft in one direction causes said drive straps to pull said movable blade assembly on its downward or shearing stroke and push said movable blade assembly back up on its return stroke.

6. The drive system according to claim 5 wherein said rotary actuator receives one end of said drive shaft and is adjustably mounted onto one of the side members of said frame housing.

7. A blade gap adjustment mechanism adapted for use with sheet material shearing machines having a fixed lower blade mounted between opposed end walls of a frame housing and an upper blade assembly mounted for vertical reciprocation between said opposed end walls past said lower blade on each stroke to effect a shearing of one or more sheets of material inserted between said lower blade and said upper blade assembly, said blade gap adjustment mechanism comprising:
   a) a pair of gib brackets, each of which includes a track extending substantially vertically, and a ram having a blade fixed thereto, said ram being vertically reciprocal in said tracks;
   b) a pair of vertically spaced mounting pins extending inwardly from each of said side walls of said housing;
   c) one of said gib brackets being suspended from said mounting pins adjacent the inner wall of each of said side walls;
   d) each of said gib brackets having at least one circular opening therein;
   e) an eccentric cam mounted for rotation within said opening in said gib bracket and including an aperture therein through which the lowermost of said mounting pins extends in non-rotatable relation thereto, the center of said aperture in said eccentric cam being spaced from the center of said opening in said gib bracket, whereby rotation of said cam causes said forward or rearward movement of said gib bracket;
   f) means for rotating said eccentric cam in either a clockwise or counter-clockwise direction.

8. The blade gap adjustment mechanism according to claim 7 wherein said means for rotating said eccentric cam includes an adjustment block attached to said eccentric cam and having a threaded opening therein, said threaded opening being substantially aligned with the intended path of movement of said gib bracket, a threaded rod extending through said threaded opening in said adjustment block, said threaded rod being mounted for rotation to said side wall of said frame housing and means for rotating said threaded rod.

9. The blade gap adjustment mechanism according to claim 7 and further including a shift means connecting said gib bracket to the uppermost of said vertically spaced mounting pins for providing for a vertical movement of said gib bracket responsive to the rotation of said eccentric cam.

10. The blade gap adjustment mechanism according to claim 9 wherein said shift means includes a generally rectangular opening or window in said gib bracket at a point spaced above said circular opening and a slide block positioned in vertically slidable relation to said gib bracket within said window, said slide block being mounted on said uppermost mounting pin.

11. The blade gap adjustment mechanism according to claim 10 wherein said slide block includes a circular opening therein, an eccentric cam mounted for rotation within said circular opening in said slide block, and said eccentric cam includes a circular aperture therein for mounting said eccentric cam in nonrotatable relation to said uppermost mounting pin, and means for adjustably fixing said eccentric cam to said slide block, whereby the angle of said track may be adjusted with respect to said fixed blade by rotating said eccentric cam within said slide block.

12. The blade gap adjustment mechanism according to claim 11 wherein said means for adjusting said eccentric cam comprises a circular flange surrounding said eccentric cam with a plurality of arcuately spaced openings therein, said openings being selectively aligned with mating openings in said slide block to adjustably mount said eccentric cam thereon.

13. A hold down apparatus adapted for use with sheet material shearing machines having a fixed lower blade mounted on a bed plate extending between opposed end walls of a frame housing and an upper blade assembly mounted for vertical reciprocation between opposed end walls past said lower blade on each stroke to effect a shearing of one or more sheets of material inserted between the blades, said hold down apparatus comprising:
   a) a support having an upper wall and a lower wall and extending between said end walls;
   b) means for affixing said support to said end walls;
   c) a plurality of hold down pins extending through said upper and lower walls at spaced points therealong;
   d) spring means for biasing said hold down pins toward said bed plate; and
   e) a slotted lift bracket mounted on said upper blade assembly and extending into operative engagement with said hold down pins, said lift bracket engaging said hold down pins during the upward stoke of said upper blade assembly to lift said hold down pins out of engagement with said sheet of material, and said lift bracket releasing said hold down pins during the downward stroke of said upper blade assembly to allow said hold down pins to move into engagement with said sheet of material positioned therebelow;
   f) stop means for limiting the path of travel of said hold down pins to a point spaced from said bed plate.

14. The hold down apparatus according to claim 13 wherein said hold down pins include an enlarged lower cylindrical portion extending through said lower wall and a rod of lesser diameter extending upwardly from said lower cylindrical portion through said upper wall, and said spring means includes a compression spring surrounding said rod and extending between said upper wall and said enlarged lower cylindrical portion.

15. The hold down apparatus according to claim 14 wherein said stop means includes a threaded portion on said rod and a stop nut threadably mounted thereon above said upper wall, the distance between said stop nut and said upper wall being less than the corresponding distance between the lower end of said hold down pin and said bed plate when said hold down apparatus is in its uppermost position.

16. An apparatus adapted for sue in adjustably mounting a drive motor or actuator onto machines having a pair of side walls with a rotatable drive shaft extending therebetween, said drive shaft extending through bearings on each side wall and having said motor mounted on the exterior side of said side walls in operative engagement with the extending portion of said drive shaft, the adjustable motor mounting apparatus comprising:
   a) means for journalling said drive shaft in the bearings in both side walls;

b) a pair of diametrically opposed mounting lugs extending outwardly from said side wall on either side of said drive shaft and having opposed flattened surfaces;

c) a mounting bracket having a central opening therein for receiving said drive shaft and means for affixing said motor or actuator to one surface thereof at a position surrounding said drive shaft;

d) said mounting bracket including a pair of spaced slots therein at positions corresponding to said mounting lugs;

e) the length and width of each of said slots being slightly greater than the corresponding dimensions of said lugs;

f) means for securing said mounting bracket to said lugs in a prescribed fixed position; and g) whereby said motor is secured to said mounting bracket and said mounting bracket is adjustably mounted to said mounting lugs.

17. A sheet material shearing machine comprising:
a) a frame including a pair of spaced side walls;
b) a bed plate secured between said side walls and including a fixed lower blade extending between said side walls and secured to said bed plate;
c) a gib bracket mounted on the inner surface of each of said side walls in opposed relation to each other and including a vertical track thereon;
d) a ram extending between said side walls and slidably retained for substantially vertically reciprocal movement within said tracks, and an upper blade assembly secured to the bottom edge of said ram adjacent the upstream side thereof;
e) a drive system associated with said machine for activating said ram in said vertically reciprocal path between an uppermost position with said upper blade assembly spaced above a workpiece placed on said bed plate and a lowermost position in which said upper blade assembly has moved through said workpiece severing a portion thereof from the remainder of said workpiece;
f) said drive system comprising:
  i) a reciprocating rotary hydraulic actuator mounted to said frame;
  ii) a drive shaft extending between said side walls in parallel relation to said upper blade assembly and operatively connected to said rotary actuator for reciprocal rotary motion responsive thereto;
  iii) a pair of drive straps, each having an opening in the lower end thereof, each of said drive straps receiving said drive shaft through said opening and being operatively connected thereto by an eccentric can, said eccentric can being keyed to said shaft and rotatively received within said opening, the axis of said shaft through said eccentric cam being spaced from the center of said cam, whereby reciprocal rotary motion of said drive shaft imparts vertical reciprocal movement of said drive straps;
  iv) the upper end of said drive straps being pivotally connected to opposite sides of said upper blade assembly.

18. The shearing machine according to claim 17 wherein there are provided a pair of hydraulic actuators, each hydraulic actuator being operatively connected to opposite ends of said drive shaft for providing an even upward and downward movement of said upper blade assembly.

19. The shearing machine according to claim 17 wherein said reciprocating hydraulic rotary actuator includes a stop means for limiting the reciprocal rotary motion of said reciprocating hydraulic rotary actuator to an arc of approximately 180°, and wherein each of said eccentric cams is so connected to the corresponding drive strap that one end of the 180° arc corresponds to the uppermost position of said upper blade assembly and the other end of said 180° arc corresponds to the lowermost end of said upper blade assembly, whereby successive pairs of 180° arcs substended by said reciprocating hydraulic rotary actuator results in either the upward or downward stroke of said upper blade assembly.

20. The shearing machine according to claim 19 wherein the distance between the axis of said drive shaft and the center of said eccentric cam equals one-half of the stroke of said upper blade assembly.

21. The shearing machine according to claim 19 wherein said drive shaft is journalled in bearing relationship to and extends between said side walls of said frame beneath and in parallel relation to said upper blade assembly, and wherein each of said drive straps is pivotally attached to the lower portion of said upper blade assembly, whereby reciprocal rotary motion of said drive shaft in one direction causes said drive straps to pull said upper blade assembly on its downward or shearing stroke and push said upper blade assembly back up on its return stroke.

22. The shearing machine according to claim 21 wherein said rotary actuator receives one end of said drive shaft and is adjustably mounted onto one of the side walls of said machine housing.

23. The shearing machine according to claim 17 and further including a blade gap adjustment mechanism for adjusting the horizontal position of said upper blade assembly with respect to the said lower blade, said blade gap adjustment mechanism comprising:
a) a pair of gib brackets, each of which includes a track extending substantially vertically, and a ram having a blade fixed thereto, said ram being vertically reciprocal in said tracks;
b) a pair of vertically spaced mounting pins extending inwardly from each of said side walls of said frame;
c) one of said gib brackets being suspended from said mounting pins adjacent the inner wall of each of said side walls;
d) each of said gib brackets having at least one circular opening therein;
e) an eccentric cam mounted for rotation within said opening in said gib bracket and including an aperture therein through which the lowermost of said mounting pins extends in non-rotatable relation thereto, the center of said aperture in said eccentric cam being spaced from the center of said opening in said gib bracket, whereby rotation of said cam causes said forward or rearward movement of said gib bracket;
f) means for rotating said eccentric cam in either a clockwise or counter-clockwise direction.

24. The shearing machine according to claim 23 wherein said means for rotating said eccentric cam includes a block attached to said eccentric cam and having a threaded opening therein, said threaded opening being substantially aligned with the intended path of movement of said gib bracket, a threaded rod extending through said threaded opening in said plate, said threaded rod being mounted for rotation to said side wall of said frame, and means for rotating said threaded rod.

25. The shearing machine according to claim 23 and further including a shift means connecting said gib bracket to the uppermost of said vertically spaced mounting pins for providing for a vertical movement of said gib bracket responsive to the rotation of said eccentric cam.

26. The shearing machine according to claim 25 wherein said shift means includes a generally rectangular opening or window in said gib bracket at a point spaced above said circular opening and a slide block positioned in vertically slidable relation to said gib bracket within said window, said slide block being mounted on said uppermost mounting pin.

27. The shearing machine according to claim 26 wherein said slide block includes a circular opening therein, an eccentric cam mounted for rotation within said circular opening in said slide block, and said eccentric cam includes a circular aperture therein for mounting said eccentric cam in non-rotatable relation to said uppermost mounting pin, and means for adjustably fixing said eccentric cam to said slide block, whereby the angle of said track may be adjusted with respect to said fixed blade by rotating said eccentric cam within said slide block.

28. The shearing machine according to claim 27 wherein said means for adjusting said eccentric cam comprises a circular flange surrounding said eccentric cam with a plurality of arcuately spaced openings said openings being selectively aligned with mating openings in said slide block to adjustably mount said eccentric cam thereon.

29. The shearing machine according to claim 17 and further including a hold down apparatus comprising:
    a) a support having an upper wall and a lower wall and extending between said side walls;
    b) means for affixing said support to said side walls;
    c) a plurality of hold down pins extending through said upper and lower walls at spaced points therealong;
    d) spring means for biasing said hold down pins toward said bed plate; and
    e) a slotted lift bracket mounted on said upper blade assembly and extending into operative engagement with said hold down pins, said lift bracket engaging said hold down pins during the upward stoke of said upper blade assembly to lift said hold down pins out of engagement with said sheet of material, and said lift bracket releasing said hold down pins during the downward stroke of said upper blade assembly to allow said hold down pins to move into engagement with said sheet of material positioned therebelow;
    f) stop means for limiting the path of travel of said hold down pins to a point spaced from said bed plate.

30. The shearing machine according to claim 26 wherein said hold down pins include an enlarged lower cylindrical portion extending through said lower wall and a rod of lesser diameter extending upwardly from said lower cylindrical portion through said upper wall, and said spring means includes a compression spring surrounding said rod and extending between said upper wall and said enlarged lower cylindrical portion.

31. The shearing machine according to claim 30 wherein said stop means includes a threaded portion on said rod and a stop nut threadably mounted thereon above said upper wall, the distance between said stop nut and said upper wall being less than the corresponding distance between the lower end of said hold down pin and said bed plate when said hold down apparatus is in its uppermost position.

32. The shearing machine according to claim 17 and further including an apparatus for adjustably mounting said actuator comprising:
    a) means for journalling said drive shaft in bearings in both the side walls with a portion thereof extending through at least one of said side walls;
    b) a pair of diametrically opposed mounting lugs extending outwardly from said side wall on either side of said drive shaft and having opposed flattened surfaces;
    c) a mounting bracket having a central opening therein for receiving said drive shaft and means for affixing said actuator to one surface thereof at a position surrounding said drive shaft;
    d) said mounting bracket including a pair of spaced slots therein at positions corresponding to said mounting lugs;
    e) the length and width of each of said slots being greater than the corresponding dimensions of said lugs;
    f) means for securing said mounting bracket to said lugs in a prescribed fixed position; and
    g) whereby said actuator is secured to said mounting bracket and said mounting bracket is adjustably mounted to said mounting lugs.

* * * * *